United States Patent
Roberts et al.

(10) Patent No.: US 6,375,423 B1
(45) Date of Patent: Apr. 23, 2002

(54) METHOD FOR REMOVAL OF DOVETAILED TURBINE BUCKET FROM A TURBINE WHEEL

(75) Inventors: Dennis William Roberts, Schenectady; Todd Joseph Fischer, Ballston Spa; Kevin Brian DeWan, Warwick, all of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/746,480

(22) Filed: Dec. 26, 2000

(51) Int. Cl.⁷ ................................................ F01D 5/30
(52) U.S. Cl. ........................ 416/2; 416/222; 29/889.1
(58) Field of Search .................... 416/2, 219 R, 416/220 R, 222, 248, 216, 217, 218; 29/889.1, 889.21, 889.22

(56) References Cited

U.S. PATENT DOCUMENTS

| | | | |
|---|---|---|---|
| 4,702,673 A | * 10/1987 | Hansen et al. | ............... 416/218 |
| 5,310,312 A | * 5/1994 | Balfour | ......................... 416/2 |
| 5,474,423 A | * 12/1995 | Seeley et al. | ................ 416/222 |
| 5,494,408 A | * 2/1996 | Seeley et al. | ................ 416/222 |
| 6,142,737 A | * 11/2000 | Seeley et al. | ................ 416/222 |

FOREIGN PATENT DOCUMENTS

JP      61-234207 A   * 10/1986            416/219 R

* cited by examiner

*Primary Examiner*—Christopher Verdier
(74) *Attorney, Agent, or Firm*—Nixon & Vanderhye P.C.

(57) ABSTRACT

A method has been developed for removing turbine buckets that have become stuck to a turbine rotor wheel. This method includes making two or more first cuts to the base of a female dovetail of the turbine bucket. Two or more second cuts are also made to a lower neck of the female dovetail. The blade of the bucket is broken off at the first cut, which breakage also splits the base of the dovetail into two sections. These sections are pressed down along the second cuts so that they may be removed from the wheel.

14 Claims, 4 Drawing Sheets

METHOD FOR REMOVAL OF DOVETAILED TURBINE BUCKET FROM A TURBINE WHEEL

FIELD OF THE INVENTION

This invention relates to a method for removing turbine buckets from a turbine rotor in a steam turbine.

BACKGROUND OF THE INVENTION

Dovetail attachments between turbine buckets and turbine rotor wheels are well known and commonly used. Dovetail joints typically comprise a male dovetail on the rim of a rotor wheel and a female dovetail at the base of each turbine bucket to be attached to the wheel. The male dovetail extends annularly around the rim of the wheel and includes a series of annular hooks each extending laterally from wheel. The male dovetail has in cross section a pyramid shape that loosely fits into the female dovetail of each bucket. To tighten the bucket fit on the wheel, the wheel has a lip ("rolled") that seats the buckets on the wheel.

The female dovetail has a wide-mouth channel cross-sectional shape, to slide over the male dovetail. The channel forming the female dovetail has "necks", which are parallel grooves in the sidewall of the channel. The male dovetail has "hooks" which are annular ridges that extend around the wheel, except for a notch in the wheel. The hooks of the male dovetail fit into necks formed in the female dovetails of the turbine buckets. The notch in the wheel is where turbine buckets are normally inserted and removed from the wheel.

The interlocking male and female dovetails form a loose fit between the turbine buckets and rotor wheel. When subjected to centrifugal forces from the rotating turbine wheel, the dovetail fit is sufficient to firmly hold the turbine buckets during steam turbine operation. When the wheel is stationary, the loose fit allows the female and mail dovetail joints to slide with respect to each other and, thus, enables technicians to easily remove and install buckets from the wheel.

Corroded and damaged turbine buckets must be removed from rotor wheels, so that the buckets can be replaced. Buckets corrode and erode, usually along the length of their blades. These corroded and eroded buckets must be removed from the rotor wheel to be replaced. Typically, all buckets on a specific turbine wheel are exposed to the same conditions and, therefore, corrode and erode at approximately the same rate. Generally, all buckets on a wheel are periodically removed and replaced together.

The loose fit between the dovetail joints can bind, after thousands of hours of operation of the turbine wheel. The dovetail joints bind together due to the high temperatures and pressures at which the buckets and wheels operate, the severe forces that act on the wheel and buckets, and the caustic hot gases that pass over the buckets. These conditions can cause the dovetail joints between the buckets and wheel to bind and form a permanent tight fit. When the dovetail joint binds, it is nearly impossible to slide the bucket over the male dovetail and remove the bucket from the wheel.

In the past, when a bucket became stuck on a wheel, a single cut was made in the base of the bucket, just above the top of the female dovetail. The blade of the turbine bucket was broken off at the cut. Once the blade was removed, one solid mass of the female dovetail portion of the base was left stuck on the wheel. The dovetail from the decapitated bucket and the male dovetail of the wheel were still stuck together.

After the blade was broken off, it was difficult to rotate the female dovetail around the male dovetail so as to remove the female dovetail from the wheel. The application of considerable force was required to slide the remaining female piece around the wheel to a notch from which the dovetail could be removed. This force involved the use of an impact tool, such as an air hammer or a peening gun. The impact of the tool often caused extensive damage to the turbine wheel. Moreover, it was difficult to slide each side of the female dovetail at the same rate around the wheel. When the two sides of the dovetail slide at different rates, the dovetail pinched the wheel and became even harder to remove.

The turbine wheel, which includes the male dovetail, is particularly susceptible to damage when hit by a hammer or other hard tool that is usually used to remove a stuck bucket. The damage to the wheel results in substantial and costly repairs or potential replacement of the male dovetail. Accordingly, there is a long-felt need for a method and system to efficiently remove dovetailed turbine buckets from the turbine wheel while minimizing the risk of damage to the wheel.

SUMMARY OF THE INVENTION

A method and system has been developed for efficiently removing turbine buckets that have become bound or stuck to a rotor wheel. The method and system is especially suited to turbine buckets that have dovetails. The method and system involves using a cutting device to cut multiple grooves into the female dovetail of the bucket. The cuts allow the blade of the bucket to be removed, and then the female dovetail to be sectioned. The dovetail sections are removed from the wheel. This method is particularly suited for servicing industrial steam turbines and for use by power system service centers. The method does not damage turbine wheels, but does destroy damaged buckets. The bucket removal method has been used to remove a row of buckets from a wheel in two to three hours, in contrast to the 15 to 31 hours previously required.

This method includes making two or more first cuts to the upper neck of a female dovetail of the turbine blade, and making two or more second cuts adjacent a lower neck of the female dovetail. The blade of the bucket is broken off at the first cuts, which breakage also splits the base of the dovetail into two dovetail sections on opposite sides of the male dovetail portion of the turbine wheel. These dovetail sections are further split along the second cuts. The split sections are removed by directly removing the sections or sliding them around the wheel to a notch, which normally is used to remove buckets.

In particular, the removal method involves cutting, at least, four relief cuts to the female dovetail section of the turbine buckets. The relief cuts are single cuts made horizontally at a neck of the female bucket component. Two upper relief cuts are made on either side of the bucket near the top of the dovetail joint. These two upper cuts are made to a depth just less than completely through the bucket. These upper cuts allow the blade portion to be removed by striking it with a force sufficient to break the blade away from the bucket. After the blade is broken away, two separate pieces of the bucket's female dovetail are attached to the male dovetail of the wheel. The relief cuts are made such that when the bucket blade is removed, the flat, top portion of the male dovetail wheel is exposed.

Two similar relief cuts are made just above the bottom of the bucket. These cuts are made to relieve the tight fit of the bottom dovetail that resulted during operations from the wheel pressing and rolling against the bucket. Additional relief cuts may be made, as necessary, at locations on the bucket that are bound to the wheel. These cuts relieve any force exerted by the male dovetail holding the bucket piece to the turbine wheel. These lower cuts allow the remaining two halves of the female dovetail to be directly removed from the wheel or slid around the wheel and removed at the wheel notch.

BRIEF DESCRIPTION OF THE DRAWINGS

These, as well as other objects and advantages of this invention, will be more completely understood and appreciated by careful study of the following more detailed description of the presently preferred exemplary embodiments of the invention taken in conjunction with the accompanying drawings, in which.

DETAILED DESCRIPTION OF THE INVENTION

Figure 1:
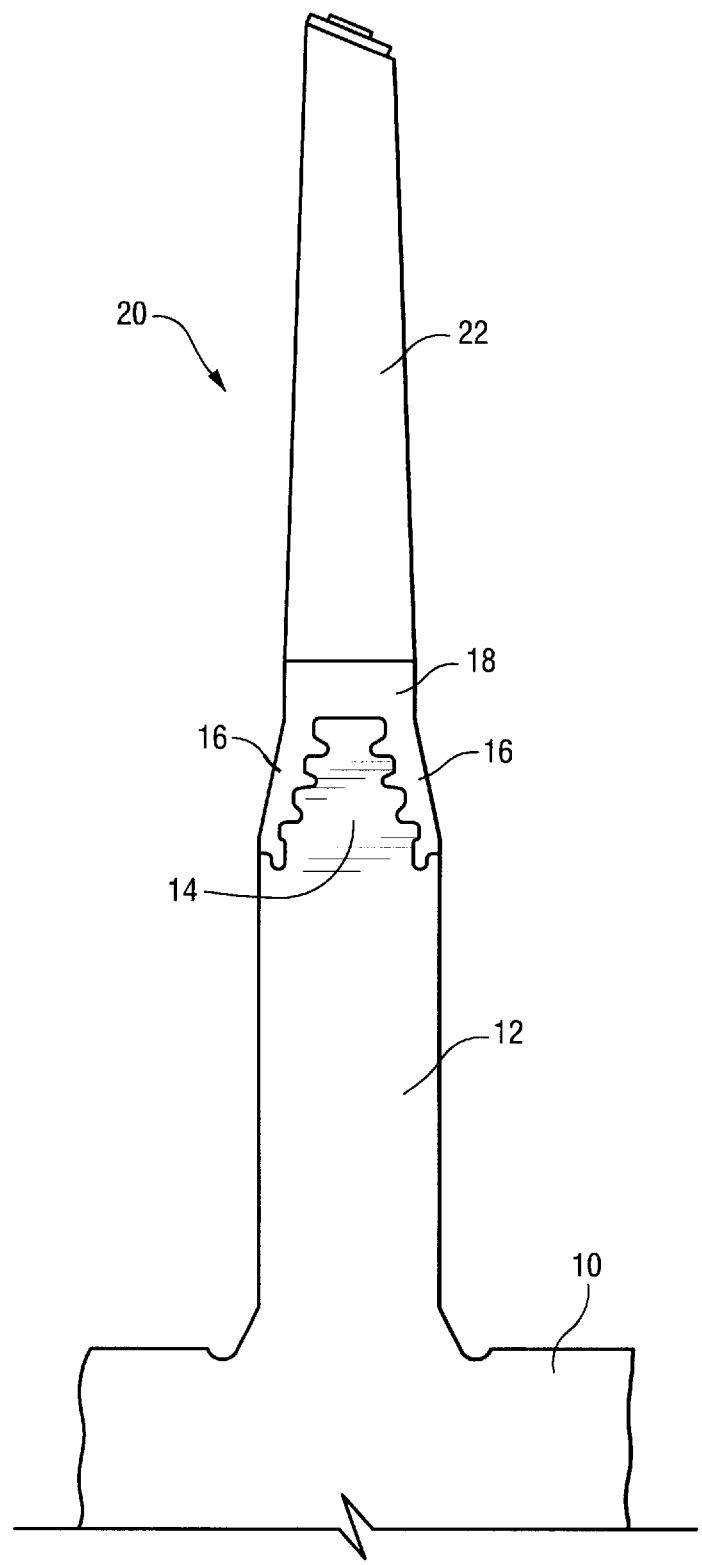
FIG. 1 is a partial side and cross-sectional view of a rotor body, rotor wheel, and bucket.

FIG. 1 illustrates a rotor body 10 with integral rotor wheel 12 and associated wheel dovetail 14. The wheel dovetail is a male dovetail that engages the female dovetails 16 in the base 18 of each turbine bucket 20 mounted on the wheel. A bucket, including a bucket dovetail, is shown in place on the wheel. The bucket includes a blade 22 that extends radially outward from the base 18, which includes the female dovetail 16.

Figure 2:
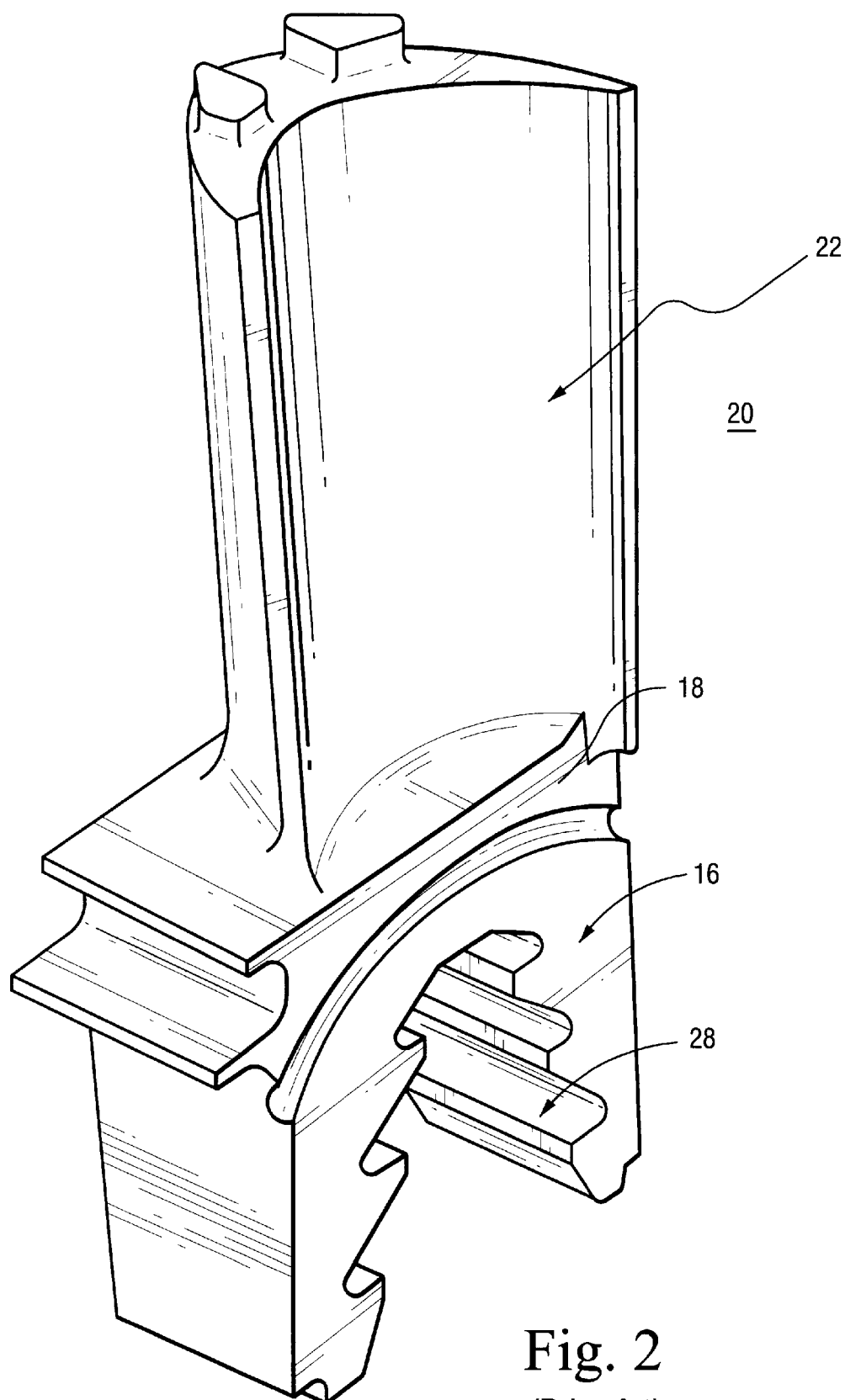
FIG. 2 is a profile view of a typical steam turbine bucket.

FIG. 2 shows a conventional steam turbine bucket 20. The blade 22 extends upright from a base 18 of the bucket. The base includes the female dovetail portion 16. The dovetail forms an inverted "V" shaped channel 28 to receive the male dovetail of the wheel. The opposing sidewalls of the channel 28 of the female dovetail include necks 36, which are a series of parallel grooves extending across the length of the sidewalls. These necks are designed to match with the hooks of the male dovetail on the turbine wheel.

Figure 3:
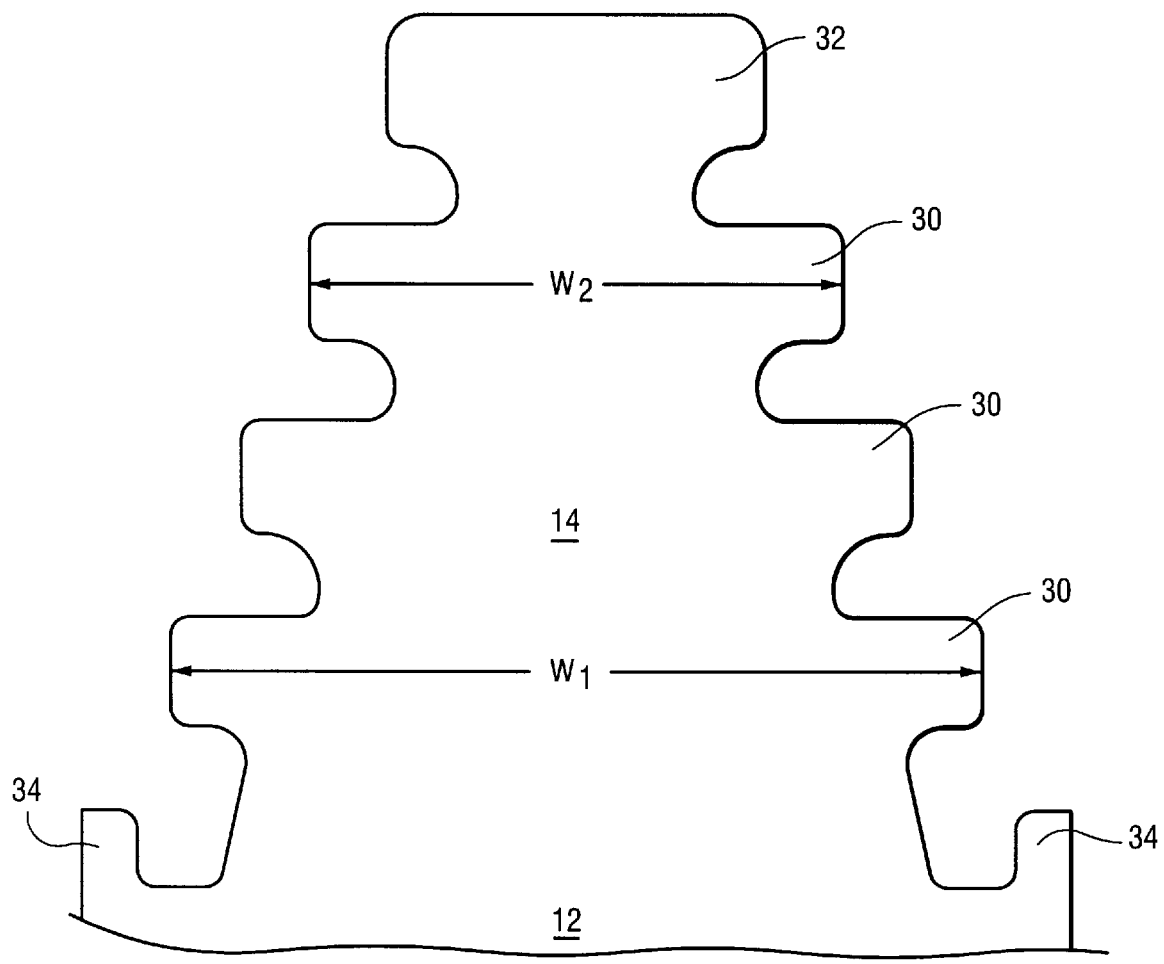
FIG. 3 is a cross-sectional view of a male dovetail of wheel.

FIG. 3 shows in cross-section a male dovetail 14. The male dovetail is on the rim of the turbine wheel and forms an annular ring around the turbine wheel. The male dovetail has an ascending series of necks 30 which are each annular rings extending around the turbine wheel. Necks protrude from either side of the turbine wheel. The lower neck, which is radially inward toward the axis of the turbine wheel, has a width ($W_1$) that is wider than the width ($W_2$) of the other hooks that are radially outward from the lower hook. Each successive hook is narrower than the lower hook.

The radially outward-most portion of the male dovetail is a rim 32 which forms the outward-most hook of the male dovetail. In addition, the male dovetail includes a pair of lips 34 on opposite sides of the wheel and formed at the base of the male dovetail.

The male dovetail extends annularly around the wheel, except for a notch section in the wheel. The notch section is free of the hooks 30 and provides an exit on the rim on the wheel to allow the installation and removal of turbine buckets. In normal operation, turbine buckets are inserted onto the notch of the wheel and slid annularly along the male dovetail and around the wheel to the appropriate position for each bucket. Similarly, turbine buckets are normally removed from the wheel by sliding each bucket around the male dovetail of the wheel to the notch on the wheel. At the notch, the turbine bucket can be radially removed from the wheel. When the turbine bucket becomes stuck on the wheel, the present method of cutting the bucket off of the wheel is required. In some instances, multiple turbine buckets become stuck on the wheel and in the most difficult circumstances, all turbine buckets on a wheel become stuck. In those instances, cuts are made in one or more or all of the turbine buckets that are stuck on the wheel.

Figure 4:
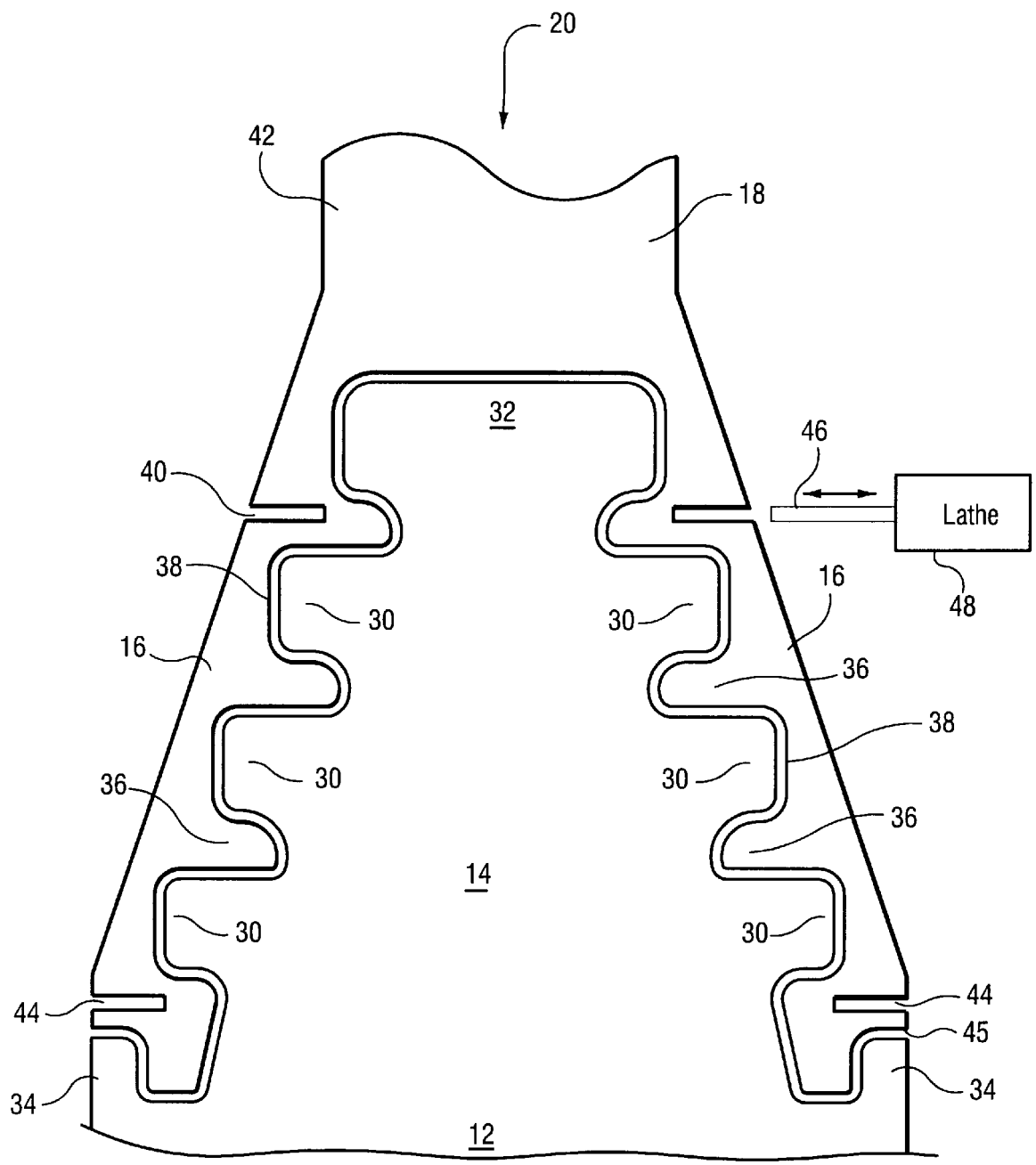
FIG. 4 is a cross-sectional view of a dovetail joint showing relief cuts made to a turbine bucket.

FIG. 4 shows in cross-section the cuts made in a turbine bucket 20 so that it may be removed from a wheel 12. The base 18 of the bucket includes a female dovetail 16 that is engaged with the male dovetail 14 of the turbine wheel. The hooks 30 of the male dovetail fit into the necks 36 of the sidewalls 38 of the female dovetail.

The turbine bucket 20 shown in FIG. 4 is stuck to the turbine wheel 12. To remove the bucket from the wheel a first pair of relief cuts 40 are made in the base 18 at a location adjacent the rim 32 of the wheel. The cut 40 weakens the bucket such that the portion of the bucket, including the blade, above the cut 40 can be easily broken away from the bucket and removed from the turbine wheel. The removal of this upper section 42 of the bucket leaves exposed the outer periphery of the turbine wheel, which is the outer surface of the rim 32. In addition, a second relief cut 44 is made in the base of the bucket. The second relief cut is made before the blade is broken off from the bucket. The second relief cut is made on opposite sides of the base of the bucket and may generally be at a location just above the lip 34 of the wheel and just below the lowest neck 30 on the male dovetail of the wheel. For example, the second relief cut may be near the lower outer edges 45 of the bucket, e.g., within 0.060 inches (0.154 cm) of the outer edge.

The two upper relief cuts 40 are made at the lower edge of the upper neck (rim) 32 of the female bucket. The cuts approach the lower edge of the upper hook of the male dovetail. The cuts do not pass through the internal surface of the female neck. Rather, the relief cuts extend to a depth that leaves a small amount of material surrounding the male hooks. These two relief cuts weaken the metal at the upper female neck. The upper portion of the bucket is removed by striking it, such as with a brass hammer. Once the blade breaks away, the two halves of the female dovetail 16 remain attached to the rotor wheel.

The relief cuts 40, 44 may be a single continuous cut; two semi-spherical cuts around the upper female neck, or a sequence of cuts in the neck. The relief cuts are made with a parting device or a cutting device 46 mounted to a lathe 48. These devices make the relief cuts to the buckets in succession as the lathe turns the rotor wheel around its axis. The relief cuts may be made to one bucket, several selected buckets or to a complete row of turbine buckets, that extend annularly around a turbine wheel. Each bucket is cut in succession around the wheel. These cuts do not extend beyond the interface of the female turbine bucket component and the male turbine wheel component. To cut into the wheel would cause damage to the wheel and potentially result in costly repairs or replacement of the turbine rotor.

The two additional relief cuts 44 are made to the female dovetail in the middle of the lower female neck. These two cuts are also made by the parting device or the cutting device 46 mounted to a lathe 48. These cuts are made to relieve the tight fit of the bottom dovetail that resulted from the turbine wheel pressing and rolling against the inside of the bucket.

Other relief cuts may be made at necessary locations on the neck of the female dovetail to sufficiently relieve any forces exerted by the male dovetail.

The second relief cut 44 forms a pair of narrow gaps opposite sides of the lower portion of the female dovetail. The two remaining halves of the female dovetail 16 are pressed down to collapse relief cut 44 as the relief cut collapses, female dovetail sections break free and separate from the wheel. The dovetail halves can be radially removed from the wheel, or slid around the rim of the wheel to the wheel notch. The detached bucket sections can be removed with considerably less force than the traditional removal methods for stuck buckets.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of removing a turbine bucket from a turbine wheel, wherein the bucket includes a blade and a base having a female dovetail, said method comprising the steps of:
   a. making a first relief cut in a first location of the base of said bucket;
   b. breaking the bucket at the first relief cut to separate the blade from the base of the bucket;
   c. making a second relief cut at a second location in the base, wherein the second location is radially inward of the first location;
   d. applying a force to the dovetail to collapse a gap formed by the second relief cut, and
   e. removing the female dovetail from the wheel.

2. A method as claimed in claim 1, wherein the first and second relief cuts are made with a parting or cutting device attached to a lathe and the wheel is mounted on the lathe while the cuts are made.

3. A method as claimed in claim 1, wherein the turbine rotor wheel is for a steam turbine.

4. A method as claimed in claim 1, wherein the female dovetail has one or more necks.

5. A method as in claim 1, wherein the separation of the blade from the bucket exposes an outer rim of the wheel, and separates the base into a first section having a first sidewall of the dovetail, and a second section having a second sidewall of the dovetail.

6. A method as in claim 1, wherein the first relief cut is a pair of cuts made in opposite sides of the bucket and extending partially through the base of the bucket.

7. A method as in claim 6, wherein the pair of cuts are made at a location on the base radially inward of the outer periphery of the wheel.

8. A method as in claim 1, wherein the second relief cut is a pair of second relief cuts in opposite sides of the female dovetail.

9. A method as in claim 8, wherein the pair of second relief cuts are at a location in the female dovetail radially inward of all hooks on the male dovetail of the wheel.

10. A method as in claim 9 wherein the pair of second relief cuts are radially outward of a lip of the male dovetail.

11. A turbine bucket mounted on a turbine wheel comprising:
    a blade;
    a base from which the blade extends, said base including a female dovetail section engaged with a male dovetail of the turbine wheel;
    wherein said base includes a pair of first relief cuts extending partially through opposite sides of said base, and said first relief cuts are aligned with a rim of the wheel, and a pair of second relief cuts extending partially through said base and said second relief cuts are radially inward of said first pair of relief cuts.

12. A turbine bucket as in claim 11, wherein the relief cuts are perpendicular to an axis of the blade.

13. A turbine blade as in claim 11, wherein the blade is corroded and is to be removed from the turbine wheel.

14. A turbine bucket as in claim 11, wherein the first relief cuts weaken the bucket such that the blade readily breaks off from the base, and the base readily separates into pieces at the second relief cuts.

* * * * *

UNITED STATES PATENT AND TRADEMARK OFFICE
CERTIFICATE OF CORRECTION

PATENT NO. : 6,375,423 B1 Page 1 of 1
DATED : April 23, 2002
INVENTOR(S) : Roberts et al.

It is certified that error appears in the above-identified patent and that said Letters Patent is hereby corrected as shown below:

Column 1,
Lines 16 and 17, change "extending laterally from wheel." to -- extending laterally from the wheel --.

Column 3,
Line 22, change "wheel" to -- the wheel --

Column 5,
Line 7, change "cut 44 as" to -- cut 44. As --

Signed and Sealed this

Eighteenth Day of June, 2002

*Attest:*

*Attesting Officer*

JAMES E. ROGAN
*Director of the United States Patent and Trademark Office*